(12) United States Patent
Cai et al.

(10) Patent No.: US 11,624,873 B2
(45) Date of Patent: Apr. 11, 2023

(54) WIDE-BAND MULTIMODE INTERFERENCE COUPLER WITH ARBITRARY POWER SPLITTING RATIO AND METHOD FOR MAKING THE SAME

(71) Applicant: MARVELL ASIA PTE LTD., Singapore (SG)

(72) Inventors: Hong Cai, San Jose, CA (US); Jie Lin, San Jose, CA (US)

(73) Assignee: MARVELL ASIA PTE LTD., Singapore (SG)

( * ) Notice: Subject to any disclaimer, the term of this patent is extended or adjusted under 35 U.S.C. 154(b) by 62 days.

(21) Appl. No.: 17/218,748

(22) Filed: Mar. 31, 2021

(65) Prior Publication Data

US 2022/0317372 A1 Oct. 6, 2022

(51) Int. Cl.
| | |
|---|---|
| *G02B 6/12* | (2006.01) |
| *G02B 6/136* | (2006.01) |
| *G02B 6/122* | (2006.01) |
| *G02B 6/293* | (2006.01) |

(52) U.S. Cl.
CPC ....... *G02B 6/12007* (2013.01); *G02B 6/1228* (2013.01); *G02B 6/136* (2013.01); *G02B 6/29344* (2013.01)

(58) Field of Classification Search
CPC .. G02B 6/12007; G02B 6/1128; G02B 6/136; G02B 6/29344
See application file for complete search history.

(56) References Cited

U.S. PATENT DOCUMENTS

| | | | | |
|---|---|---|---|---|
| 5,410,625 | A * | 4/1995 | Jenkins | H01S 3/0315 385/28 |
| 2015/0104128 | A1* | 4/2015 | Oka | G02B 6/126 385/11 |
| 2016/0011370 | A1* | 1/2016 | Okayama | G02B 6/1228 385/14 |
| 2018/0172913 | A1* | 6/2018 | Lin | G02B 6/2726 |
| 2021/0018681 | A1* | 1/2021 | Picard | G02B 6/2813 |
| 2022/0317372 | A1* | 10/2022 | Cai | G02B 6/12007 |

\* cited by examiner

*Primary Examiner* — Tina M Wong (57) ABSTRACT

A method for making a multimode interference (MMI) coupler with an arbitrary desired splitting ratio includes forming a thin-film of silicon-nitride material overlying a SOI substrate. The method further includes obtaining geometric parameters of a standard MIMI coupler including a rectangular MMI block and one input port and two output ports in taper shape with one of standard splitting ratios under self-imaging principle which is close to the desired splitting ratio. Additionally, the method includes tunning the input port to an off-center position at front edge of the MMI block. The method further includes making a first output port to a first off-center position flushing with a side edge of the MMI block, adjusting a second output port to a second off-center position. The method includes tunning the MMI block to obtain optimized geometric parameters for approaching the selected arbitrary splitting ratio, and etching the thin-film of silicon-nitride material.

21 Claims, 5 Drawing Sheets

WIDE-BAND MULTIMODE INTERFERENCE COUPLER WITH ARBITRARY POWER SPLITTING RATIO AND METHOD FOR MAKING THE SAME

BACKGROUND OF THE INVENTION

The present invention relates to a silicon photonics technology. More particularly, the present invention provides a method for making a wide-band multimode interference coupler with arbitrary optical power splitting ratio.

Over the last few decades, the use of broadband communication networks exploded. In the early days Internet, popular applications were limited to emails, bulletin board, and mostly informational and text-based web page surfing, and the amount of data transferred was usually relatively small. Today, Internet and mobile applications demand a huge amount of bandwidth for transferring photo, video, music, and other multimedia files. For example, a social network like Facebook processes more than 500 TB of data daily. With such high demands on data and data transfer, existing data communication systems need to be improved to address these needs.

Silicon photonics has become very popular for broadband optical communication applications because of the potential to combine high performance in high-speed data rate with low-cost fabrication based on matured CMOS technology to have various photonic devices being integrated directly in silicon-on-insulator substrates. For example, optical power splitter can be configured on silicon photonic platform. Low loss, broadband optical power splitters have become key building blocks for silicon photonic integrated circuits for broadband optical communication based on dense or coarse wavelength division multiplexing technology. Polarization multiplexing is another attractive, low-cost, and simple way to increase transmission capacity. Polarization insensitive power management also becomes important in next generation polarization-independent silicon photonic circuits. Among many designs of broadband optical power splitters, multimode interference (MMI) couplers based on silicon waveguides show advantages in low wavelength dependent loss, robust for fabrication process, relatively insensitive to polarization. However, power splitting ratios of conventional 1×2 MMI couplers are limited to a few fixed values at 50:50, 85:15, 72:28, etc. based on overlapping self-imaging principle, while many optical signal processing needs arbitrary especially small percentage power splitting in either DWDM or CWDM applications.

Therefore, it is desired to develop an improved method of making an MMI coupler with arbitrary optical power splitting ratio between 50:50 and 100:0 for broadband wavelengths in C-band or O-band.

BRIEF SUMMARY OF THE INVENTION

The present invention relates to method in photonic broadband communication. More particularly, the present invention provides a method for making a wide-band multimode interference coupler with arbitrary optical power splitting ratio for C-band or O-band. Merely by example, the present invention is applied to fabrication of silicon-nitride-based 1×2 MMI coupler with arbitrary optical power splitting ratio in robust process and characterized by compact size, minimum excess loss, and stable wide-band performance. It also can be used in some coherent light communication applications with small polarization-dependent loss, though other applications are possible.

In modern electrical interconnect systems, high-speed serial links have replaced parallel data buses, and serial link speed is rapidly increasing due to the evolution of CMOS technology. Internet bandwidth doubles almost every two years following Moore's Law. But Moore's Law is coming to an end in the next decade. Standard CMOS silicon transistors will stop scaling around 5 nm. And the internet bandwidth increasing due to process scaling will plateau. But Internet and mobile applications continuously demand a huge amount of bandwidth for transferring photo, video, music, and other multimedia files. This disclosure describes techniques and methods to improve the communication bandwidth beyond Moore's law.

In an embodiment, the present invention provides a method for making a multimode interference (MMI) coupler with an arbitrary desired splitting ratio. The method includes providing a silicon-on-insulator (SOI) substrate. The method further includes forming a thin film of silicon nitride material overlying the SOI substrate. Additionally, the method includes designing a standard MMI coupler including a MMI block in rectangular shape and one input port and two output ports in taper shape with one of standard splitting ratios under self-imaging principle which is close to the arbitrary desired splitting ratio. The method further includes tunning the input port to an off-center position at front edge of the MMI block compared to the standard MMI coupler. Furthermore, the method further includes making a first output port of the two output ports to a first off-center position at back edge of the MMI block and adjusting a second output port of the two output ports to a second off-center position for approaching the desired splitting ratio. The method includes tuning the MMI block in rectangular shape based on the off-centered position of the input port to obtain optimized geometric parameters for achieving the desired splitting ratio. Moreover, the method includes etching the thin film of silicon nitride material based on the optimized geometric parameters of the MMI block, the input port, and the two output ports to form the MMI coupler with the desired splitting ratio.

In an alternative embodiment, the present invention provides a multimode interference (MMI) coupler with an arbitrary optical power splitting ratio over broadband wavelengths. The MMI coupler includes a planar waveguide block made by silicon nitride material in rectangular shape of a width and a length between a front edge and a back edge. The MMI coupler further includes an input port in taper shape coupled to the front edge of the planar waveguide block at an off-center position to introduce asymmetric multimode interference mode excitation distribution in the planar waveguide block based on which the length of the planar waveguide block and the off-center position are both optimized to achieve a desired optical power splitting ratio. Additionally, the MMI coupler includes two output ports in taper shapes coupled to the back edge of the planar waveguide block. These two output ports are positioned off-center and optimized to accommodate the asymmetric multimode interference mode excitation distribution at the MMI block back edge to achieve the desired optical power splitting ratio. The desired optical power splitting ratio includes an arbitrary value between 50:50 and 100:0 excluded from any one of standard optical power splitting ratio under self-imaging principle.

Many benefits of the improved MMI coupler with arbitrary optical power splitting ratio provided by this invention can be achieved for broadband optical communication applications. As an example, the method for making this MMI coupler is very fabrication friendly compared to other existing couplers designed with exotic geometric shapes or cascaded with added phase-shifter to achieve arbitrary splitting ratio. The present method requires just one-step etch on silicon nitride material laid on silicon-on-insulator substrate, which is fully compatible with Si CMOS technology. The fabrication process is very robust to yield to arbitrary splitting ratio in a desired value which is stable over wideband wavelengths. The silicon-nitride-based MMI coupler with arbitrary optical power splitting ratio of the present invention substantially retains and expands advantages of conventional Si-based MMI couplers in low insertion loss, large bandwidth, single stage without cascaded structure, simple rectangular shape and very compact size. It further provides improved performance of polarization dependent loss for some MMI couplers with high splitting ratio, which is necessary in some photonic integrated circuits for coherent light communication.

The present invention achieves these benefits and others in the context of disclosed multimode interference excitation technology in waveguide block based on silicon substrate. However, a further understanding of the nature and advantages of the present invention may be realized by reference to the latter portions of the specification and attached drawings.

BRIEF DESCRIPTION OF THE DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

DETAILED DESCRIPTION OF THE INVENTION

The present invention relates to method in photonic broadband communication. More particularly, the present invention provides a method for making a wide-band multimode interference (MMI) coupler with arbitrary optical power splitting ratio for C-band or O-band. Merely by example, the present invention is applied to fabrication of silicon-nitride-based 1×2 MMI coupler with arbitrary optical power splitting ratio in robust process and characterized by compact size, minimum excess loss, and stable wide-band performance. It also can be used in some coherent light communication applications with small polarization-dependent loss, though other applications are possible.

Multi-mode interference (MMI) couplers or splitters are among most important optical functional devices in photonics integrated circuits (PICs). They offer many advantages such as wide optical bandwidth and large fabrication tolerance. These outstanding merits make them suitable for fabricating various optical devices such as beam splitters, couplers, and switches. In optical signal processing, for example, dividing the signal into two uneven parts is often required. The main output branch is responsible for the transmission of the signal and the minor output branch is responsible for monitoring the signal. This "tap" function is ordinarily used in ultra-compact PICs. Traditional 1×2 MIMI couplers are limited to a few splitting ratios such as 85:15, 72:28, 50:50 due to restriction of self-imaging principle associated with an MMI block in a regular planar waveguide in rectangular shape. For power saving signal monitoring, a coupler with a small and arbitrary splitting or tap ratio is highly desired in many advanced optical communication applications. While, all existing couplers with arbitrary splitting or tap ratio function is either made with exotic geometric shape or cascaded in much longer length with added phase shifter, suffering in fabrication tolerance and device performance in bandwidth, excess loss, and unaccepted large size. In the present disclosure, arbitrary optical power splitting ratio beyond the traditional fixed ratios at 85:15, 72:28, 50:50 is achieved with asymmetrically adjusted input/output port positions and widths associated with a compact MMI block in similar rectangular shape. In the following sections, a method for making the MMI coupler with arbitrary optical power splitting ratio is presented and several examples of silicon-nitride-based MMI couplers with exemplary 60:40 or 95:5 splitting ratios are shown with their wide-band performance over either whole C-band or O-band wavelengths. Further, in addition to other adjustment in port position, the MMI coupler disclosed herein can be used for applications with polarization independent light with matching beat length within a slightly expanded length of the MMI block to excite general interference mode excitations independent on either polarization modes.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, edge, top, bottom, forward, reverse, major, minor, branch, have been used for convenience purposes only and are not intended to imply any particular fixed direction. Instead, they are used to reflect relative locations and/or directions between various portions of an object.

Figure 1:
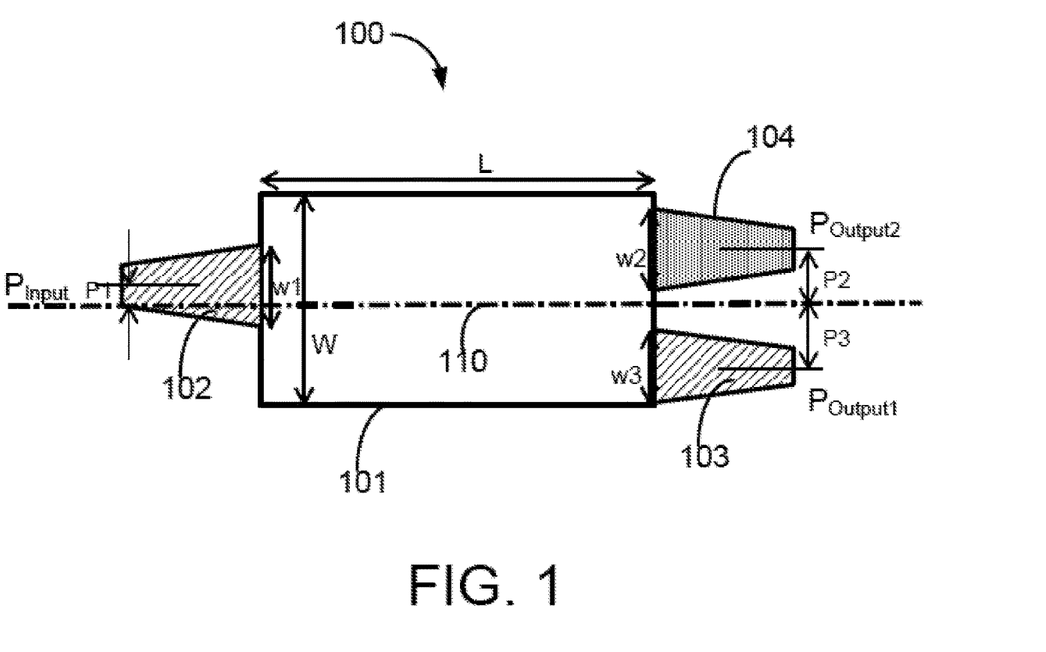
FIG. 1 is a simplified diagram of a multimode interference (MMI) coupler with arbitrary optical power splitting ratio for wide-band wavelengths according to an embodiment of the present invention.

FIG. 1 is a simplified diagram of a multimode interference (MMI) coupler with arbitrary optical power splitting ratio for wide-band wavelengths according to an embodiment of the present invention. This diagram is merely an example, which should not unduly limit the scope of the claims. One of ordinary skill in the art would recognize many variations, alternatives, and modifications. As shown, a multimode interference (MMI) coupler 100 is provided as a MMI block 101 of a certain thickness formed on a substrate. The MMI block 101 has an ultra-compact planar waveguide block in rectangular footprint of a width W and a length L with an input port 102 in taper shape coupled to a front edge of the MMI block 101, and two output ports, a first output port 103 in taper shape and a second output port 104 in taper shape, coupled to a back edge of the MMI block 101. Optionally, the MMI block 101 of the MMI coupler 100 is configured to receive light wave with wide-band wavelengths from the input port 102 for generating multimode interference excitation therein and output the power of the light wave with splitting ratio to the two output ports 103 and 104 as a 1×2 coupler. Optionally, the input port 102 is designed to receive an optical power of $P_{Input}$, the first output port 103 is designed as a minor splitting branch to output power of $P_{Output1}$ and the second output port 104 is designed as a major (or tap) splitting branch to output power of $P_{Output2}$. In other words, for the MMI coupler with typical tap function, the $P_{Output1}$ is a minor portion of $P_{Input}$ and the $P_{Output2}$ is a major (or tap) portion of $P_{Input}$, with the ratio of $P_{Output2}/P_{Output1}$ being defined as the power splitting ratio. For evenly splitting coupler (i.e., 50:50 ratio), $P_{Output1}=P_{Output2}$. In general, $P_{Output1}+P_{Output2}<P_{Input}$, due to excess loss of the MMI coupler 100.

Optionally, the substrate for supporting the MMI coupler 100 is a silicon-on-insulator (SOI) substrate. Optionally, the MMI block 101 including the input port 102 and the two output ports 103 and 104 is made from a thin film of silicon nitride material. In an embodiment, each input or output port is a natural extension of the MMI block 101. Optionally, the MMI block 101 or the thin film of silicon nitride material is provided with a thickness of about 400 nm or less on the SOI substrate. The whole 1×2 MMI coupler 100 can be formed by one-step etch process performed in the thin film of silicon nitride material on the SOI substrate, provided all optimized geometric parameters of the width and length of the waveguide block 101 and the width and position of each port, 102, 103, or 104 are selected by design.

In a specific embodiment, the MMI coupler 100 is configured to yield any desired arbitrary power splitting ratio in the two output ports over wide-band wavelengths by designing optimum geometric parameters, i.e., the width and length, of the MMI block 101 to generate desired multimode interference mode excitation pattern therein and optimizing different taper widths and taper central positions of each input or output port 102, 103, 104 asymmetrically off a block central line 110. In the embodiment, the MMI coupler 100 is designed based on a standard MMI coupler (made of the same material) with a splitting ratio selected from one of standard splitting ratios of 50:50, 72:28, 85:15 under self-imaging principle such that the desired arbitrary splitting ratio of to-be-made MMI coupler 100 is relatively closer to the selected one of the standard splitting ratios. For example, a standard MMI coupler with the standard ratio of 85:15 is chosen to be a base for making a MMI coupler with a desired power splitting ratio of 95:5. For the standard MMI coupler, the input port is positioned at a symmetric position at the front edge to introduce symmetric multimode interference mode excitation in the MMI block for symmetric splitting such as 50:50 or at certain specific position such as W/4 position for yielding other standard splitting ratios such as 85:15. Firstly, in order to obtain the desired arbitrary splitting ratio that is not one of the standard ratios, the input port needs to be properly positioned off-center at the front edge to introduce asymmetric multimode interference mode excitation in the MMI block. Accordingly, the length L of the MMI block 101 will be modified from those of the standard MMI coupler with a standard splitting ratio close to the desired arbitrary splitting ratio to accommodate the asymmetric multimode interference mode excitation of the light wave introduced from the off-centered input port. Optionally, the width W of MMI block 101 is kept substantially the same, e.g., about 3 to 4 μm, as the standard MMI coupler to retain its compact size while the length L of MMI block 101 may be adjusted to yield asymmetric mirror images forming at back edge of the MMI block 101 to be associated with corresponding output ports with various excited mode power coefficients and related phase based on the asymmetric multimode interference excitation distribution.

Further in the embodiment, the width and central position of each input or output port in taper shape can be adjusted and optimized. Optionally, the taper head width of each taper shape port is fixed to be about 0.7 μm, the same as the standard MMI coupler, which is for coupling with standard silicon waveguides of the same width in photonic integrated circuits and is usually fixed without further adjustment. The taper length of each port may be adjusted or typically enlarged a little to lower the excess loss of the MMI coupler 100. Optionally, the taper length is chosen to be about 3 μm. As seen in FIG. 1, the input port 102 in taper shape is characterized by a base width w1 and a central position P1 designed as a distance asymmetrically off the central line 110 of the MMI block 101. Furthermore, the first input port 103 in taper shape is characterized by a base width w3 and a central position P3 off the central line 110. Moreover, the second output port 104 in tape shape is characterized by a base width w2 and a central position P2 off the central line 110. In an embodiment, the first input port 103 is fixed to a position with a restriction of P3=W/2−w3/2 in order to comply with the design rules of commercial CMOS foundries. This means that the first output port is fixed with its taper base flushing with one side edge of the MMI block 101 while the base widths and central positions of the input port 102 and the second output port 104 are optimized to achieve the desired arbitrary splitting ratio for the MMI coupler 100.

Additionally, the optimization of the geometric parameters of the MMI block 101 in rectangular shape and the input port 102 and two output ports 103 and 104 in taper shape should be done, like the standard MMI coupler, to achieve the desired non-standard power splitting ratio for wide-band wavelengths such as C-band or separately O-band. The optimum geometric parameters of the MMI coupler for C-band may be slightly different from those for O-band. In the embodiment, arbitrary value of the non-standard power splitting ratio of the MMI coupler is achieved by exciting the modes in the MMI block 101 with the optimum geometric parameters at corresponding off-center positions for the input or output ports.

In an alternative embodiment, the MMI coupler 100 of FIG. 1 in simple rectangular shape and ultra-compact size with arbitrary power splitting ratio can be used for handling a polarization dependent light wave in TE mode and TM mode. The principle for designing such MMI coupler would be no different from what has been described above. One particular adjustment is to properly configure the length L while keeping the width W of the silicon-nitride-based MMI block 101 so that a general interference mode to excite multiple beats of images of the light wave in TE or TM mode for wide-band wavelengths in C-band or generate different lengths for beats of images for wide-band wavelengths in O-band. To achieve the polarization insensitive performance, which requires matching the beating length for both TE mode and TM mode, the length L of the MMI block 101 with arbitrary splitting ratio might be slightly longer than the single polarization case. When applying the MMI coupler 100 for monitoring optical signals in both TE polarization mode and TM polarization mode over O-band wavelengths, the matching TE/TM beat length requirement in the MMI block 101 may cause the second output port 104 that is leveled with a side edge of the MMI block 101 to become a major (e.g., 85%) splitting branch and the first output port 103 to become a minor (e.g., 15%) splitting branch. However, since the general interference mode excitation in the MMI block may generate different lengths for TE/TM beats of images for wide-band wavelengths in C-band, the MMI coupler with similar arbitrary splitting ratio (e.g., 85:15) for both polarized modes over C-band wavelengths may have the first output port 103 to be the minor splitting branch and the second output port 104 to be the major splitting branch.

Figure 2:
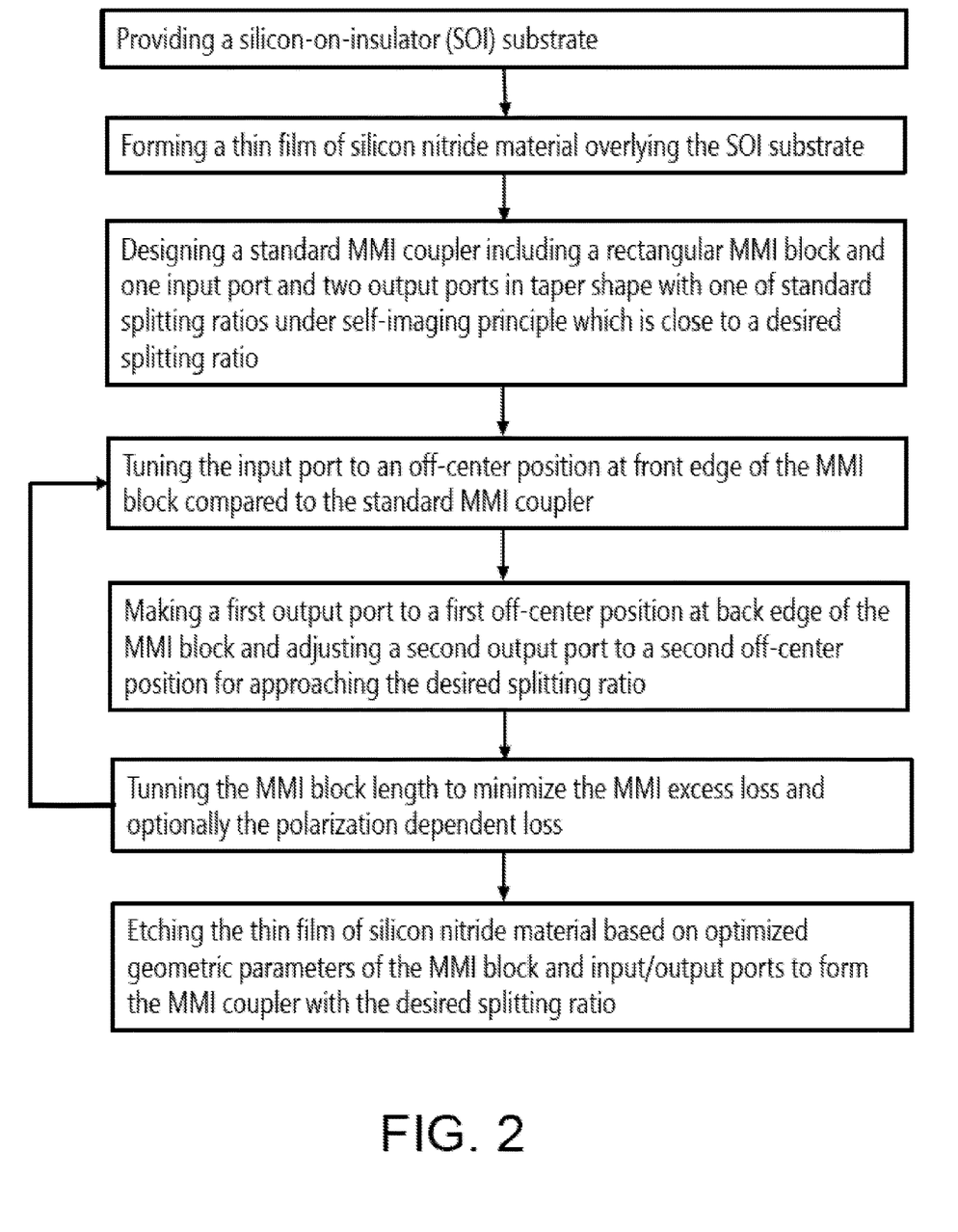
FIG. 2 is a flow chart showing a method for making a MMI coupler with arbitrary optical power splitting ratio for wide-band wavelengths according to an embodiment of the present invention.

FIG. 2 is a flow chart showing a method for making a MMI coupler with arbitrary optical power splitting ratio for wide-band wavelengths according to an embodiment of the present invention. This diagram is merely an example, which should not unduly limit the scope of the claims. One of ordinary skill in the art would recognize many variations, alternatives, and modifications. The method for making an MMI coupler with arbitrary optical power splitting ratio for wide-band wavelengths includes a step of providing a silicon-on-insulator (SOI) substrate and a step of forming a thin film of silicon nitride material overlying the SOI substrate. Optionally, using SOI substrate allows convenient access to matured CMOS technology compatible with fabrication of many other silicon photonic devices. The thin film silicon nitride material is employed to provide a planar waveguide platform to enable a broad class of low-loss planar-integrated devices and chip-scale solutions that benefit from transparency over a wide wavelength range (400-2350 nm) and fabrication using wafer-scale processes in new generation of system-on-chip applications. The silicon nitride waveguides are characterized by low loss, which allows it to be able to handle high optical power and be engineered for linear and nonlinear optical functions. As signal bandwidth and data rates continue to increase, the optical circuit functions and complexity made possible with silicon nitride has expanded the practical application of optical signal processing functions that can reduce energy consumption, size and cost over today's digital electronic solutions.

Referring to FIG. 2, the method further includes a step of designing a standard MMI coupler including a rectangular MMI block and one input port and two output ports in taper shape with one of standard splitting ratios under self-imaging principle which is close to a desired value of a (non-standard) splitting ratio for the to-be-made MMI coupler. Optionally, the standard MMI coupler is also based on silicon nitride material. In particular, the step of designing can be performed by one of electromagnetic field propagation simulators based on corresponding compact model with proper inputs on material, optical, and geometric properties. This step is to set a base line for designing the MMI coupler with the desired value of the non-standard splitting ratio. The non-standard splitting ratio is referred to an arbitrary splitting ratio not one of the four standard splitting ratios: 50:50, 72:28, 85:15, and 100:0 under self-imaging principle. Optionally, the step will provide at least a base set of geometric parameters for the MMI block including input/output ports at central or symmetric positions for the standard MMI coupler. The base set of geometric parameters can be used as a starting point for designing the MMI coupler with the desired non-standard arbitrary splitting ratio.

Referring to FIG. 2 again, the method additionally includes a step of tunning the input port to an off-center position at front edge of the MMI block compared to standard MMI coupler. In an embodiment, the step includes determining the off-center position of the input port at front edge of the MMI block to be a distance away from a central line of the MMI block to introduce asymmetric multimode interference excitation in the MMI block which makes the power splitting ratio to approach the desired value of the non-standard arbitrary splitting ratio. For example, for making the MMI coupler with non-standard 60:40 splitting ratio, the input port is intentionally moved away from original symmetric location right in the central line of the MMI block. As light enters the MMI block via the input port at off-centered position, an asymmetric multimode interference excitation of the light can be generated within the MMI block which will cause changes of local intensity maximum distribution of mode excitation inside the block including the back edge region.

Referring to FIG. 2 again, the method further includes a step of making a first output port to a first off-center position at back edge of the MMI block with its taper base optionally flushing with a side edge of the MMI block and adjusting a second output port to a second off-center position for achieving the desired splitting ratio. In general, each port is configured to be a taper shape characterized by a taper length, a taper head width, a taper base width, and a central position relative to the central line of the MMI block (see FIG. 1). The taper length of each port can be adjusted to give a minimum excess loss for the MMI coupler. However, for typical MIMI coupler design, the excess loss is not a major variable for determining the splitting ratio. Therefore, the taper length for each of the input port (including input port) is usually fixed at about 3 µm the same used as the standard 1×2 MMI coupler, corresponding to an excess loss of about 0.3 to 0.5 dB for C-band or O-band MMI coupler with arbitrary splitting ratio. The taper head width of each port is also a fixed value of about 0.7 µm for coupling with silicon waveguides in the integrated circuits formed in the SOI substrate. The taper base width or each port either is the same as the standard MIMI coupler or is made slight bigger for reducing the MMI excess loss (<0.5 dB). Lastly, the central position of each port is a major adjustable geometric parameter to optimize the corresponding ports based on respective asymmetric local intensity maximum locations at the back edge of the MIMI block for matching with the asymmetric multimode interference mode excitation distribution generated in the MMI block. Optionally, for achieving the non-standard splitting ratio, the central position (e.g., P1) of the input port is shifted firstly off the central line of the MMI block to introduce asymmetric mode excitation distribution inside the MMI block which may cause local mode intensity maximum beyond the original length of MIMI block and off the original standard locations (such as W/4). This step ensures that the first off-center position of the first output port located at P3=W/2−w3/2 is near a local mode intensity minimum at the back edge of the MMI block after the optimized length of the MIMI block is obtained. This port is configured to be a minor splitting branch of the MMI coupler.

Optionally, this step of adjusting a second output port to a second off-center position is based on corresponding off-center position of the input port from which the asymmetric multimode interference mode excitation is introduced. Optionally, for achieving a desired small splitting ratio like 5%, the central position P1 of the input port is shifted (off central line) closer to the side edge of the MMI block that is flushed with the taper base of the first output port as the minor splitting branch.

Referring to FIG. 2, the method includes a step of tunning the MIMI block in rectangular shape. Optionally, the step includes fixing a width of the MMI block to the same width of the standard MMI block. For example, for C-band MMI coupler, the width of the MMI block is set to about 4 µm. For O-band MIMI coupler, the width of the MMI block is slightly smaller at about 3 µm. Therefore, this step includes tunning the length of the MMI block starting from that of standard MMI block obtained from the step of designing the standard MMI coupler. By tunning the length of the MMI block, the asymmetric multimode interference mode excitation pattern inside the MIMI block is adjusted to minimize the excess loss of the MIMI coupler.

Referring to FIG. 2, the method includes a generally optimization loop process to repeat the steps of tunning the input port, the first output port, the second output port, and tunning the MMI block to obtain an optimized set of geometric parameters of the MMI block and the input/output ports, allowing the designed power splitting ratio of the MMI coupler to approach the desired value of the non-standard arbitrary splitting ratio.

Optionally, this generally optimization loop process also includes a wavelength sweeping process for ensuring the optimized geometric parameters to have acceptable wide-band performance including C-band sweeping, for example from 1525 nm to 1565 nm or O-band sweeping, for example from 1260 nm to 1340 nm. Optionally, this step is performed over polarization insensitive optical signals including both TE mode and TM mode, in which the optimized geometric parameters for matching polarization beat length for both TE/TM mode may include a MMI block length longer than that in the case of single polarization mode. It is possible that this step may result in an offset between the optical power splitting ratio and the desired value. In order to minimize this offset, the positions of the input port P1 needs to be further tuned. Optionally, the positions of output ports P2 and P3 need to be finely tuned if necessary. Optionally, the MMI excess loss can be further reduced by tuning the MMI length L. This optimization procedure would be completed when desired optical power splitting ratio, low excess loss and optionally polarization independence are achieved.

Furthermore, the method for making a MMI coupler with arbitrary optical power splitting ratio for wide-band wavelengths includes a step of etching the thin film of silicon nitride material based on the optimized geometric parameters of the MMI block and input/output ports to form the MMI coupler with the desired splitting ratio. Once the design of the MMI coupler is determined by the steps described earlier based on electromagnetic wave propagation simulator, the optimum geometric parameters can be plugged into silicon nitride waveguide process to make the MMI block and input/output ports according to the design. A one-step etch can be performed by patterning the thin film of silicon nitride material based on the optimized geometric parameters to from the MMI coupler, which can be buried into silicon dioxide cladding layers.

Figure 3:
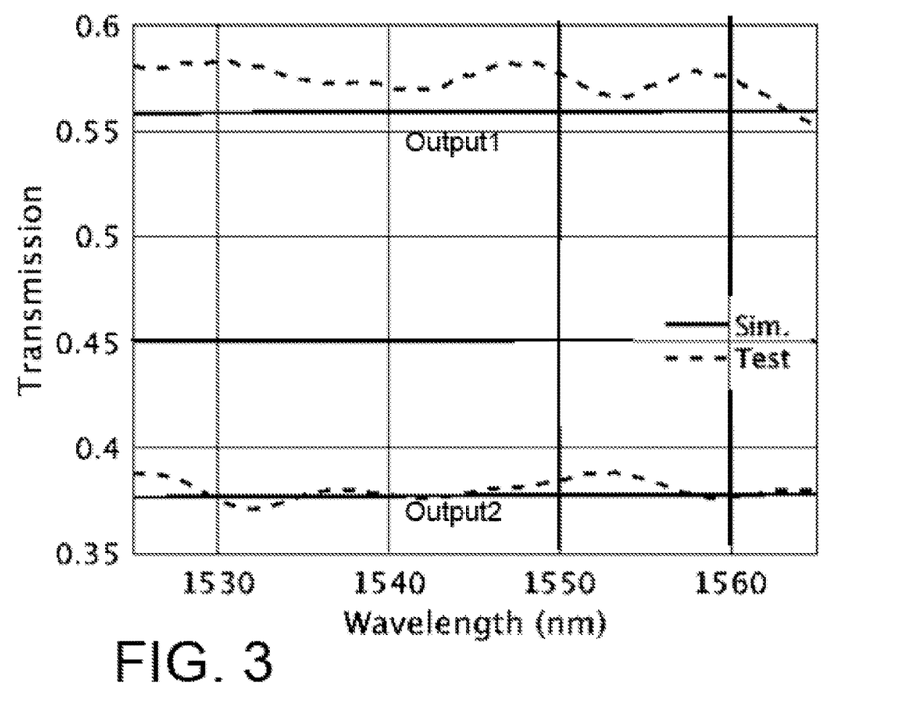
FIG. 3 is an exemplary plot of normalized transmission powers of two outputs of a MMI coupler with 60:40 splitting ratio over C-band according to an embodiment of the present invention.
Figure 4:
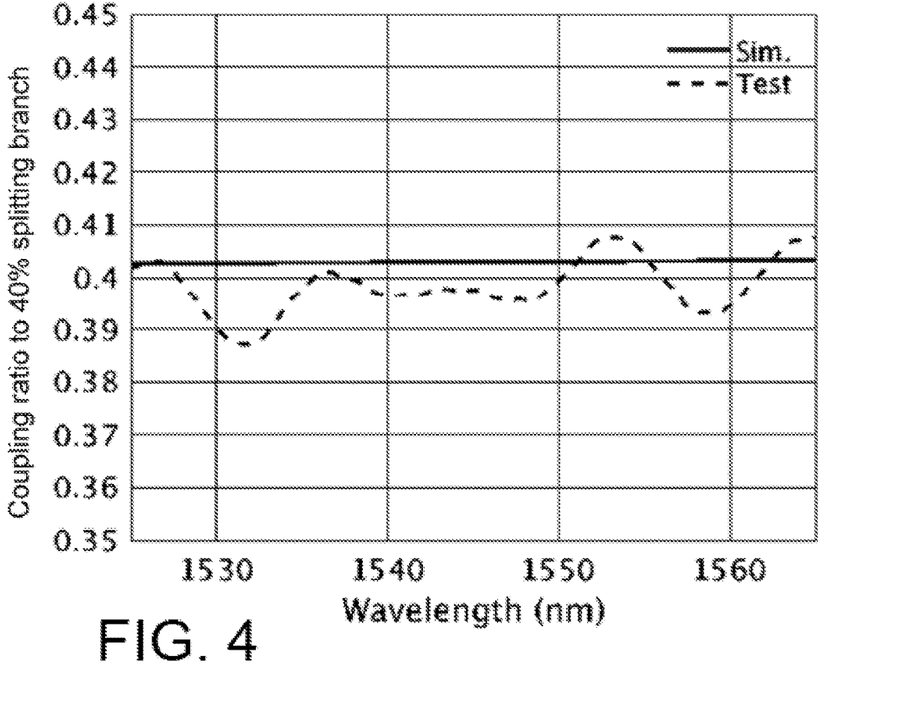
FIG. 4 is an exemplary plot of the splitting ratio variation over C-band of the MMI coupler with 60:40 splitting ratio according to an embodiment of the present invention.

FIG. 3 is an exemplary plot of normalized transmission powers of two outputs of an MMI coupler with 60:40 splitting ratio over C-band according to an embodiment of the present invention. In the embodiment, a design of the MMI coupler with intended 60:40 splitting ratio is based on standard MMI coupler with 50:50 splitting ratio. As shown, the solid curve represents normalized optical power transmitted through two output ports of a simulation MMI coupler designed with the intended 60:40 splitting ratio. Due to excess loss through each port of the MIMI coupler, the resulted major splitting branch ouptut1 yields about 0.56 normalized transmission power and the minor splitting branch output2 yields about 0.38 normalized transmission power. The simulation results are plotted against the whole C-band from 1525 nm to 1565 nm, showing very low wavelength dependency in the splitting ratio under this design, which can be represented by a wavelength dependent loss of <0.2 dB, making this MMI coupler a preferred device in WDM integrated circuits for C-band. Subsequently, a real MMI coupler with the intended 60:40 splitting ratio is made based on the design to test its performance. As shown in FIG. 3, the dashed curve represents normalized optical power transmitted through two output ports of the test MIMI coupler made based on the design. The normalized transmission power outputted via the major splitting branch ouptut1 shows a slightly wavy variation between 0.55 to 0.58 across the C-band wavelength range. The normalized transmission power outputted via the minor splitting branch output2 also shows a slightly wavy variation between 0.37 and 0.39 across the C-band wavelength range. It fits very well with the performance of the simulation MMI coupler, confirming a successful implementation of the method disclosed in FIG. 2 according to an embodiment of the present invention. In the embodiment, the splitting ratio is quite stable as the wavelength is swept through the C-band, showing the MMI coupler design is very robust, as illustrated more directly by plotting the coupling ratio to the minor branch output2 against the C-band wavelengths in FIG. 4.

Figure 5:
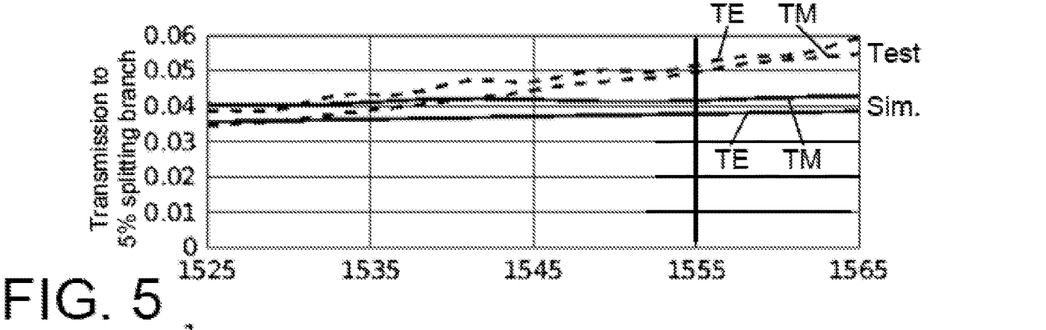
FIG. 5 is an exemplary plot of normalized transmission powers of C-band wavelengths in both TE mode and TM mode to minor branch of an MMI coupler with 95:5 splitting ratio according to an embodiment of the present invention.
Figure 6:
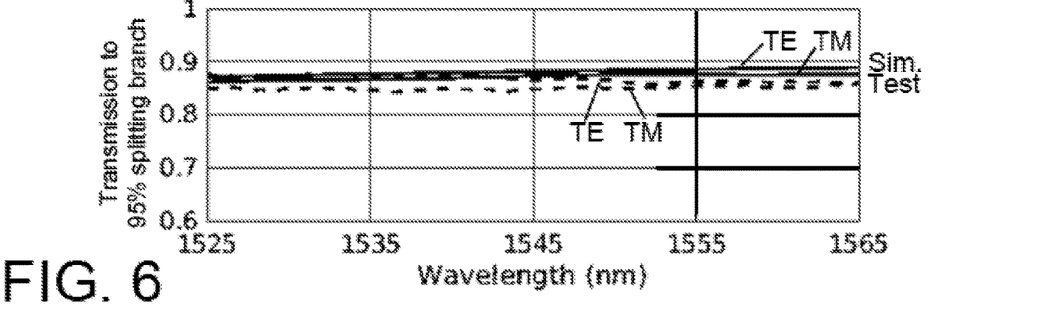
FIG. 6 is an exemplary plot of normalized transmission powers of C-band wavelengths in both TE mode and TM mode to major branch of the MMI coupler with 95:5 splitting ratio according to an embodiment of the present invention.

FIGS. 5 and 6 show an exemplary plot of normalized transmission powers of C-band wavelengths in both TE mode and TM mode splitting to respective minor branch and major branch of the MMI coupler with 95:5 splitting ratio according to an embodiment of the present invention. This MIMI coupler is designed with intended 95:5 splitting ratio based on a standard MIMI coupler with standard 85:15 splitting ratio. A simulated MMI coupler yields optimum geometric parameters for the MIMI block with an ultra-compact footprint of 3×16.0 μm. For input port, its central position is slightly off central line of the MIMI block by 0.5 μm towards one side edge of the MIMI block. For the minor splitting output port, it is optimized by making its bottom to be leveled with the edge just mentioned. For the major splitting output port, it is optimized to have its central position off the central line by 0.5 mm towards another side edge of the MIMI block. As shown, the plots of normalized transmission power are made for both TE polarization mode and TM polarization mode across the C-band range from 1525 nm to 1565 nm, giving total excess loss of about <0.45 dB. The test MMI coupler made from a design based on a simulation MMI coupler shows quite matched performance across C-band in the transmission power split into the major splitting branch compared with the simulation MMI coupler. The test MIMI coupler shows slightly higher transmission power split into the minor splitting branch in longer wavelength above 1545 nm up to 1565 nm compared with the simulation MIMI coupler. It also demonstrates excellent polarization insensitive power splitting across the C-band.

Figure 7:
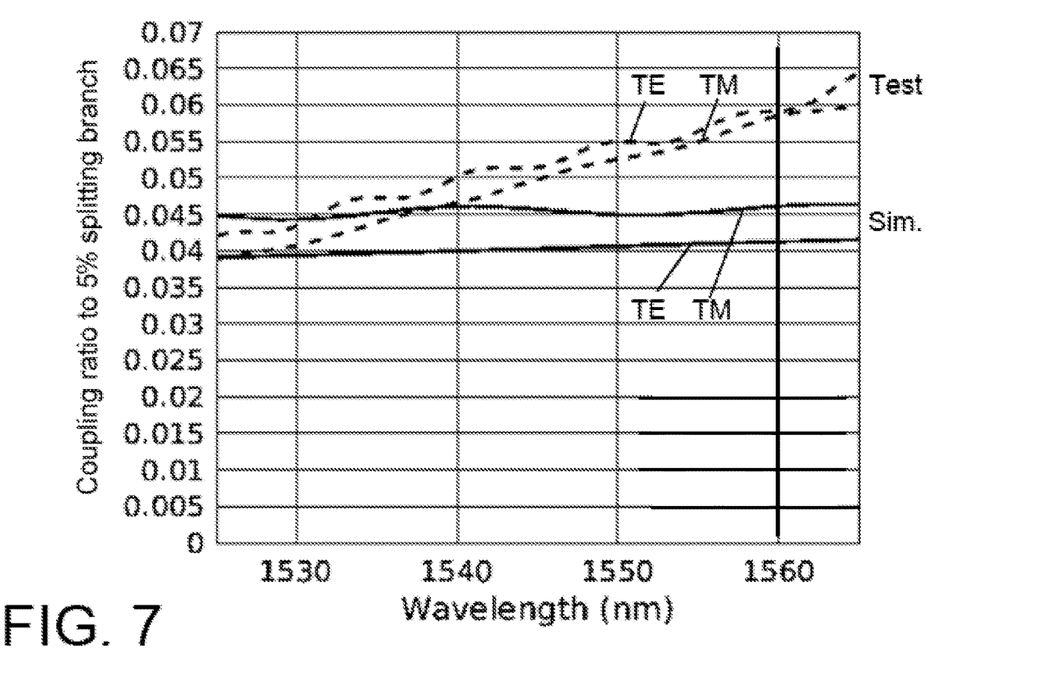
FIG. 7 is an exemplary plot of the splitting ratio variation over C-band in both TE mode and TM mode of the MMI coupler with 95:5 splitting ratio according to an embodiment of the present invention.

FIG. 7 shows an exemplary plot of the splitting ratio variation over C-band in both TE mode and TM mode of the MIMI coupler with 95:5 splitting ratio according to an embodiment of the present invention. The coupling ratio to the 5% minor splitting branch is plotted against the whole C-band wavelength range from 1525 nm to 1565 nm, showing excellent polarization insensitive power splitting. Coupling ratio to 5% minor branch is in the range of [4.3%, 6.5%] for TE polarization mode and [4.0%, 6.0%] for TM polarization mode. The performance of the test MIMI coupler is slightly off that of simulation MIMI coupler in longer wavelengths above ~1545 nm with a bigger wavelength dependent loss.

Figure 8:
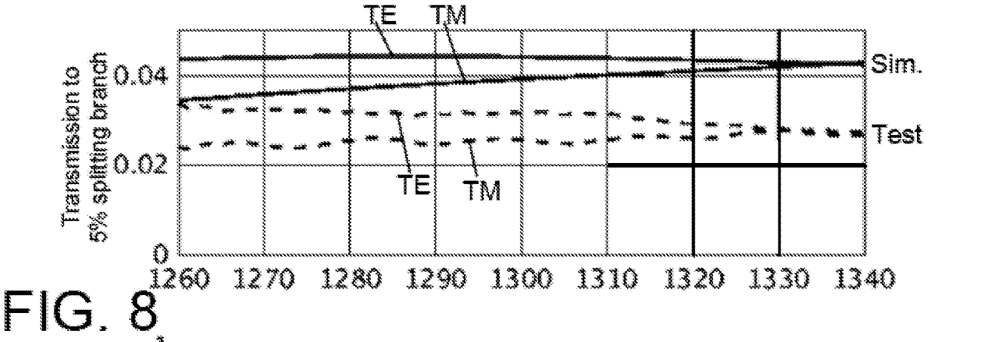
FIG. 8 is an exemplary plot of normalized transmission powers of O-band wavelengths in both TE mode and TM mode to minor branch of an MMI coupler with 95:5 splitting ratio according to an embodiment of the present invention.
Figure 9:
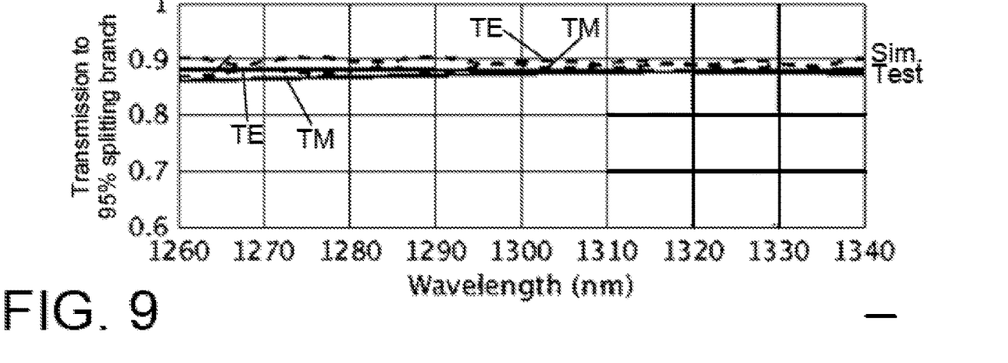
FIG. 9 is an exemplary plot of normalized transmission powers of O-band wavelengths in both TE mode and TM mode to major branch of the MMI coupler with 95:5 splitting ratio according to an embodiment of the present invention.

FIGS. 8 and 9 show an exemplary plot of normalized transmission powers of O-band wavelengths in both TE mode and TM mode splitting to respective minor branch and major branch of the MMI coupler with 95:5 splitting ratio according to an embodiment of the present invention. This MIMI coupler is designed with intended 95:5 splitting ratio based on a standard MIMI coupler with standard 85:15 splitting ratio. A simulation MIMI coupler yields optimum geometric parameters for the MIMI block with an ultra-compact footprint of 3×19.7 μm. For input port, its central position is slightly off central line of the MIMI block by 0.5 μm towards one side edge of the MIMI block. For the minor splitting output port, it is optimized by making its bottom to be leveled with the edge just mentioned. For the major splitting output port, it is optimized to have its central position off the central line by 0.5 μm towards another side edge of the MIMI block. As shown, the plots of normalized transmission power are made for both TE polarization mode and TM polarization mode across the O-band range from 1260 nm to 1340 nm, giving total excess loss of about <0.4 dB. The test MMI coupler made from a design based on a simulation MIMI coupler shows quite matched performance across O-band in the transmission power split into the major splitting branch compared with the simulation MMI coupler. The test MMI coupler shows slightly lower transmission power split of about 3% into the minor splitting branch compared with 4.5% for the simulation MMI coupler. It also demonstrates excellent polarization insensitive power splitting across the O-band.

Figure 10:
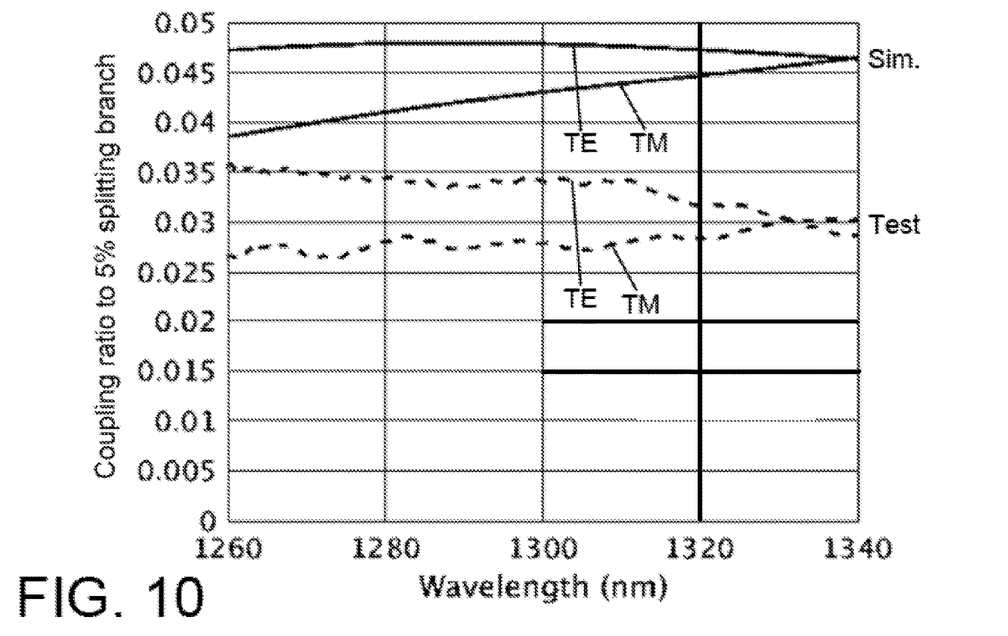
FIG. 10 is an exemplary plot of the splitting ratio variation over O-band in both TE mode and TM mode of the MMI coupler with 95:5 splitting ratio according to an embodiment of the present invention.

FIG. 10 shows an exemplary plot of the splitting ratio variation over O-band in both TE mode and TM mode of the MMI coupler with 95:5 splitting ratio according to an embodiment of the present invention. The coupling ratio to the 5% minor splitting branch is plotted against the whole C-band wavelength range from 1525 nm to 1565 nm, showing excellent polarization insensitive power splitting. Coupling ratio to the minor splitting branch is given in the range of [3%, 3.5%] for TE polarization mode and [2.5%, 3%] for TM polarization mode. The ultra-compact design of the MMI coupler as disclosed herein leads to a small polarization dependent loss of <0.2 dB in O-band wavelength at 1290 nm. This MMI coupler with 95:5 splitting ratio is well suited for monitoring each channel wavelength in CWDM application.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. An optical coupler comprising:
a rectangular waveguide;
an input port extending from a first side of the rectangular waveguide, the input port being positioned asymmetrically relative to a midpoint of the first side;
a first output port extending from a second side of the rectangular waveguide, the second side being opposite to the first side, the first output port being positioned in proximity to a third side of the rectangular waveguide at a first distance from the third side and a second distance, greater than the first distance, from a midpoint of the second side; and
a second output port extending from the second side of the rectangular waveguide, the second output port being positioned between the midpoint of the second side and a fourth side of the rectangular waveguide, the fourth side being opposite the third side, the second output port being positioned a third distance, less than the second distance, from the midpoint of the second side.

2. The optical coupler of claim 1 wherein each of the input port and the first and second output ports is trapezoidal in shape, a longer base of the input port is coupled to the first side of the rectangular waveguide, and longer bases of the first and second output ports are coupled to the second side of the rectangular waveguide.

3. The optical coupler of claim 2 wherein a midpoint of the longer base of the input port is closer to the fourth side of the rectangular waveguide than to the third side of the rectangular waveguide.

4. The optical coupler of claim 2 wherein a distance between a midpoint of the longer base of the second output port and the midpoint of the second side of the rectangular waveguide is less than a distance between a midpoint of the first output port and the midpoint of the second side of the rectangular waveguide.

5. The optical coupler of claim 2 wherein an end of the longer base of the first output port proximate to the third side is flush with the third side of the rectangular waveguide.

6. The optical coupler of claim 1 wherein when a light wave in a TE mode or a TM mode is received via the input port, a power of the light wave is split between the first and second output ports at a predetermined ratio.

7. The optical coupler of claim 1 wherein when a light wave in a TE mode or a TM mode is received via the input port, a power of the light wave is split between the first and second output ports with the first output port outputting less power than the second output port.

8. The optical coupler of claim 1 wherein when a light wave in a TE mode or a TM mode is received via the input port, a power of the light wave is split between the first and second output ports as a function of distances of the input port and the first and second output ports from a line joining the midpoints of the first and second sides of the rectangular waveguide.

9. The optical coupler of claim 1 wherein when a light wave in a TE mode or a TM mode with wavelengths in C-band or O-band is received via the input port, a power splitting ratio of the optical coupler, which is a ratio of power output from the second output port to power output from the first output port, is between 50:50 and 100:0.

10. The optical coupler of claim 1 wherein each of the input port and the first and second output ports is trapezoidal in shape and wherein longer bases of the input port and the first and second output ports are of different lengths.

11. An optical coupler comprising:
a waveguide having a plurality of surfaces, at least two of the plurality of surfaces being rectangular in shape;
an input port extending from a first rectangular surface of the plurality of surfaces; and
first and second output ports extending from a second rectangular surface of the plurality of surfaces, the second rectangular surface being opposite to the first rectangular surface,
wherein the input port and the first and second output ports are arranged asymmetrically relative to a line joining centers of the first and second rectangular surfaces.

12. The optical coupler of claim 11 wherein:
the input port is positioned asymmetrically relative to a midpoint of the first rectangular surface;
the first output port is positioned in proximity to a third surface of the plurality of surfaces at a first distance from the third surface and a second distance, greater than the first distance, from a midpoint of the second rectangular surface; and
the second output port is positioned between the midpoint of the second rectangular surface and a fourth surface of the plurality of surfaces, the fourth surface being opposite the third surface, the second output port being positioned at a third distance, less than the second distance, from the midpoint of the second rectangular surface.

13. The optical coupler of claim 12 wherein each of the input port and the first and second output ports is trapezoidal in shape, a longer base of the input port is coupled to the first rectangular surface, and longer bases of the first and second output ports are coupled to the second rectangular surface.

14. The optical coupler of claim 13 wherein a midpoint of the longer base of the input port is closer to the fourth surface than to the third surface.

15. The optical coupler of claim 13 wherein a distance between a midpoint of the longer base of the second output port and the midpoint of the second rectangular surface is less than a distance between a midpoint of the first output port and the midpoint of the second rectangular surface.

16. The optical coupler of claim 13 wherein an end of the longer base of the first output port proximate to the third surface is flush with the third surface.

17. The optical coupler of claim 11 wherein when a light wave in a TE mode or a TM mode is received via the input port, a power of the light wave is split between the first and second output ports at a predetermined ratio.

18. The optical coupler of claim 11 wherein when a light wave in a TE mode or a TM mode is received via the input port, a power of the light wave is split between the first and second output ports with the first output port outputting less power than the second output port.

19. The optical coupler of claim 11 wherein when a light wave in a TE mode or a TM mode is received via the input port, a power of the light wave is split between the first and second output ports as a function of distances of the input port and the first and second output ports from a line joining midpoints of the first and second rectangular surfaces.

20. The optical coupler of claim 11 wherein when a light wave in a TE mode or a TM mode with wavelengths in C-band or O-band is received via the input port, a power splitting ratio of the optical coupler, which is a ratio of power output from the second output port to power output from the first output port, is between 50:50 and 100:0.

21. The optical coupler of claim 11 wherein each of the input port and the first and second output ports is trapezoidal in shape and wherein longer bases of the input port and the first and second output ports are of different lengths.

* * * * *